Patented Feb. 14, 1939

2,146,839

UNITED STATES PATENT OFFICE 2,146,839

METHOD OF COATING ALUMINUM

James W. Newsome, New Kensington, and Junius D. Edwards, Oakmont, Pa., assignors to Aluminum Company of America, Pittsburgh, Pa., a corporation of Pennsylvania No Drawing. Application July 6, 1938, Serial No. 217,730

6 Claims. (Cl. 148—6)

This application is a continuation-in-part of our copending application, Serial No. 121,012, for Method of coating aluminum, filed January 16, 1937.

This invention relates to the production of oxide coated aluminum surfaces, and it is particularly concerned with a method for the production of a substantially colorless, hard, adherent and adsorptive coating consisting substantially of aluminum oxide on an aluminum surface by a non-electrolytic chemical treatment. The term aluminum as used herein and in the appended claims is intended to include both aluminum in its various degrees of purity and the aluminum base alloys.

Oxide coatings have found extensive application for the protection and decoration of aluminum surfaces. This field has been extended particularly in recent years as a result of the development of the so-called anodic oxidation methods in which hard, adherent, abrasion resistant coatings are formed on aluminum by electrolytic oxidation. These coatings are generally more or less porous and adsorbent, and can be colored, impregnated with corrosion inhibiting substances, sealed, or otherwise treated, as their particular use demands. However, these methods do not lend themselves readily to the production of oxide coatings on small articles, such as buttons, eyelets, and the like, and their use is not economical in the production of certain types of articles intended for sale at relatively low prices.

While it has been recognized that the methods of producing coatings on aluminum by simple chemical treatment without the application of electrical energy would be desirable for use in the coating of small articles, the methods heretofore available for providing oxide coatings on aluminum by a simple chemical treatment have not produced coatings which have a suitable combination of properties to recommend them for general use. In order to be satisfactory for general use, it is desirable that the coating produced should be sufficiently hard and adherent to resist the abrasion incident to ordinary use, and should preferably be substantially colorless and more or less adsorbent, so that it can be colored by dyeing or pigmenting.

It is an object of this invention to provide a chemical treatment method for the production of an oxide coating on aluminum having a combination of properties, permitting its general use as a finishing coating. It is more particularly an object of this invention to provide a method for the production of a hard, adherent, adsorbent and substantially colorless coating comprising aluminum oxide on an aluminum surface by simple chemical treatment without the aid of an electric current.

We have discovered that a relatively hard, adherent, adsorbent and substantially colorless oxide coating can be produced on aluminum and aluminum alloy surfaces by treatment of the surface with an alkali aluminate solution containing a substance which stabilizes the solution against precipitation of aluminum hydroxide by hydrolysis of the alkali aluminate. The treatment is preferably carried out in a sodium aluminate solution containing any one of the class of stabilizers comprising tannic acid, oleic acid, glucose, glycerin, and silicates. The article to be coated is preferably immersed in the stabilized alkali metal aluminate solution at an elevated temperature. The reaction between the coating solution and the metal surface, which is at first fairly vigorous, gradually becomes slower and finally stops, generally within about twenty minutes when operated at temperatures of 80 to 90° centigrade. The coating produced is relatively hard and adherent, and is more or less adsorbent and substantially colorless.

Satisfactory results may be obtained by using aluminate solutions containing as little as 0.2 per cent of sodium aluminate or as much as 6 per cent or even more, but for most purposes a concentration of 1 to 2 per cent has proved satisfactory. The amount of stabilizer used will vary with the particular stabilizer employed. When sodium silicate, tannic acid, and oleic acid are used as stabilizers, they are preferably present in small amounts such as 1 to 2 per cent of the amount of sodium aluminate in the solution. When using glucose, a somewhat greater proportion relative to the amount of sodium aluminate is desirable. Good results have been obtained using glucose in an amount equal to about 10 to 25 per cent of the amount of sodium aluminate present. Glycerin may be used over a relatively wide range of concentration with substantially equivalent results, but we prefer to use it in the solution in quantity equal to the amount of sodium aluminate present. It is important in preparing the solution that little or no alumina should separate from the sodium aluminate and precipitate as aluminum hydroxide. Heating an unstabilized solution above 50° centigrade, or standing at room temperature, for a period of in excess of a few hours may cause separation of alumina. It is preferable therefore to dissolve the stabilizer first and then dissolve the aluminate in the stabilizer solution. Alumina separates slowly, if at all, from the stabilized solution even on long standing, provided it is protected from carbon dioxide.

In view of the fact that the sodium aluminate solution is super-saturated with respect to alumina, it requires some attention to keep it working properly. During use, additional alumina is formed, and the alumina content of the solution builds up. This building up of alumina sometimes tends to block the action of the sodium aluminate on the aluminum surface, and if sufficient stabilizer is present, the alumina may build up to the point that the action of the solution is completely stopped. However, under ordinary circumstances, when using the stablizer in proper amount, the alumina formed during the use of the solution will precipitate. This precipitated alumina may tend to act as seed, causing separation and precipitation of alumina from the sodium aluminate to the point that the coating action of the solution is destroyed, and it becomes an etching action. This difficulty may be avoided by adding to the sodium aluminate solution, during use, additional small amounts of stabilizer to prevent the seeding effect of the precipitated alumina.

The temperature of the treatment is not critical. The coating operation proceeds most rapidly at elevated temperatures, and an operating temperature of 70 to 100° is preferred. A good coating is obtained within this range of temperature in about 10 to 30 minutes. As the temperature is lowered, the time required to produce a good coating increases. A good coating may be obtained at room temperature over a period of 10 to 20 hours.

Preliminary cleaning of the aluminum surface to be coated is not essential, though it may be desirable. We have found that aluminum surfaces on which there is a film of grease may be satisfactorily coated when treated according to our invention, without any preliminary treatment to remove the grease. It is generally preferred, however, to use a clean aluminum surface. In some cases it may be preferred to preliminarily etch the surface to be coated. Particularly good results may be produced on surfaces preliminarily etched in hydrofluoric acid, followed by washing with strong nitric acid.

The properties of the coating obtained by the method of our invention will vary somewhat with the composition of the aluminum or aluminum alloy surface treated, and the exact conditions of treatment used. Certain alloying constituents, such as iron and manganese, have a tendency to impart color to the coating formed, particularly if the coating solution is of relatively high concentration. It is preferable, therefore, when coating articles formed of aluminum alloys containing constituents known to have a tendency to color the coating, to use a two-step treatment in which the surface is first treated in a weak solution of sodium aluminate containing a stabilizer until a thin coating is formed, and is then subjected to the action of a more concentrated solution of sodium aluminate. A relatively colorless coating is obtained in the first step, and the thickness of the coating is built up by treatment in the more concentrated solution without obtaining an undesirable color in the coating. Certain of the stabilizers which are themselves colored, such as tannic acid, also tend to impart color to the coating. It is generally preferred, therefore, to use a colorless stabilizer in the coating solution, and we have found that sodium silicate gives the most satisfactory results.

The coatings obtained are generally more or less adsorptive, and can be colored by dyes. The adsorptive properties of the coating are generally such that the colors obtained by dyeing are the lighter, pastel shades.

As a specific example of the method of coating aluminum according to the process of our invention, we may cite the following: The aluminum to be coated was heated in a solution containing 1 per cent of sodium aluminate and .01 per cent of sodium silicate. The sodium aluminate had the approximate composition $NaAlO_2$. The sodium silicate was a commercial brand in which the soda and silica were in the ratio of about 1 to 3. The solution was maintained at a temperature of about 85° centigrade, and the treatment continued for a period of about 20 minutes. There was a visible reaction between the aluminum and the solution at the start of the treatment, as evidenced by the liberation of gas at the surface of the metal. This decreased, however, and at the end of the treatment time, all visible action had apparently ceased. After treatment the aluminum was found to be coated with a hard, adherent coating having a thickness, as determined by microscopic examination of a cross section, of about 0.0002 inch. This coating was substantially colorless.

As an example of the method of our invention applied to an aluminum alloy surface containing an alloying constituent having a tendency to color the coating formed, the following treatment is cited: An aluminum alloy containing 1.25 per cent manganese and 1.0 per cent magnesium was first immersed in a solution containing 0.5 per cent sodium aluminate and 0.005 per cent sodium silicate at a temperature of about 90° centigrade. This treatment was continued for a period of about 10 minutes. The coated surface obtained from this treatment was then immersed in a coating solution containing 2 per cent sodium aluminate and 0.03 per cent sodium silicate at a temperature of about 90° centigrade. This treatment was continued until the action stopped. There was obtained by this double treatment a substantially colorless, hard, adherent, adsorbent coating on the metal surface.

The following is a further example of the practice of our invention: The aluminum to be coated was immersed for a period of about 20 minutes in a solution containing 1 per cent of sodium aluminate and 0.3 per cent of glycerin, at a temperature of 90° centigrade. At the beginning of the treatment, the liberated gas at the surface of the metal gave evidence of a reaction between the aluminum and the solution. This liberation of gas decreased, however, and all visible action had ceased at the end of the treatment. The aluminum was thereby provided with a hard, adherent, adsorbent, substantially colorless coating which was found, upon microscopic examination of a cross section, to be about 0.000092 inch in thickness.

We claim:

1. A method of producing a hard, adherent, adsorbent, substantially colorless oxide coating on an aluminum surface, comprising treating said surface with a solution containing an alkali aluminate in an amount equal to 0.2 to 6 per cent, and a stabilizing substance selected from the group of substances consisting of glycerin and glucose.

2. A method of producing a hard, adherent, adsorbent, substantially colorless oxide coating on an aluminum surface, comprising treating said surface with a solution containing sodium aluminate in an amount equal to 0.2 to 6 per cent, and glycerine.

3. A method of producing a hard, adherent, adsorbent, substantially colorless oxide coating on an aluminum surface, comprising treating said surface with a solution containing an alkali aluminate in an amount equal to 0.2 to 6 per cent, and glucose in an amount equal to 10 to 25 per cent of said alkali aluminate present.

4. A method of producing a hard, adherent, adsorbent, substantially colorless oxide coating on an aluminum surface, comprising treating said surface with a solution containing sodium aluminate in an amount equal to 0.2 to 6 per cent, and glucose in an amount equal to 10 to 25 per cent of said sodium aluminate present.

5. A method of producing a hard, adherent, adsorbent, substantially colorless oxide coating on an aluminum surface, comprising treating said surface with a solution containing an alkali aluminate in an amount equal to 0.2 to 6 per cent, and glycerin in an amount equal to the amount of said alkali aluminate present.

6. A method of producing a hard, adherent, adsorbent, substantially colorless oxide coating on an aluminum surface, comprising treating said surface with a solution containing sodium aluminate in an amount equal to 0.2 to 6 per cent, and glycerin in an amount equal to the amount of said sodium aluminate present.

JAMES W. NEWSOME.
JUNIUS D. EDWARDS.